Aug. 5, 1930.  C. E. BALLOU  1,772,382
RAIL JOINT
Filed July 16, 1929   3 Sheets-Sheet 1
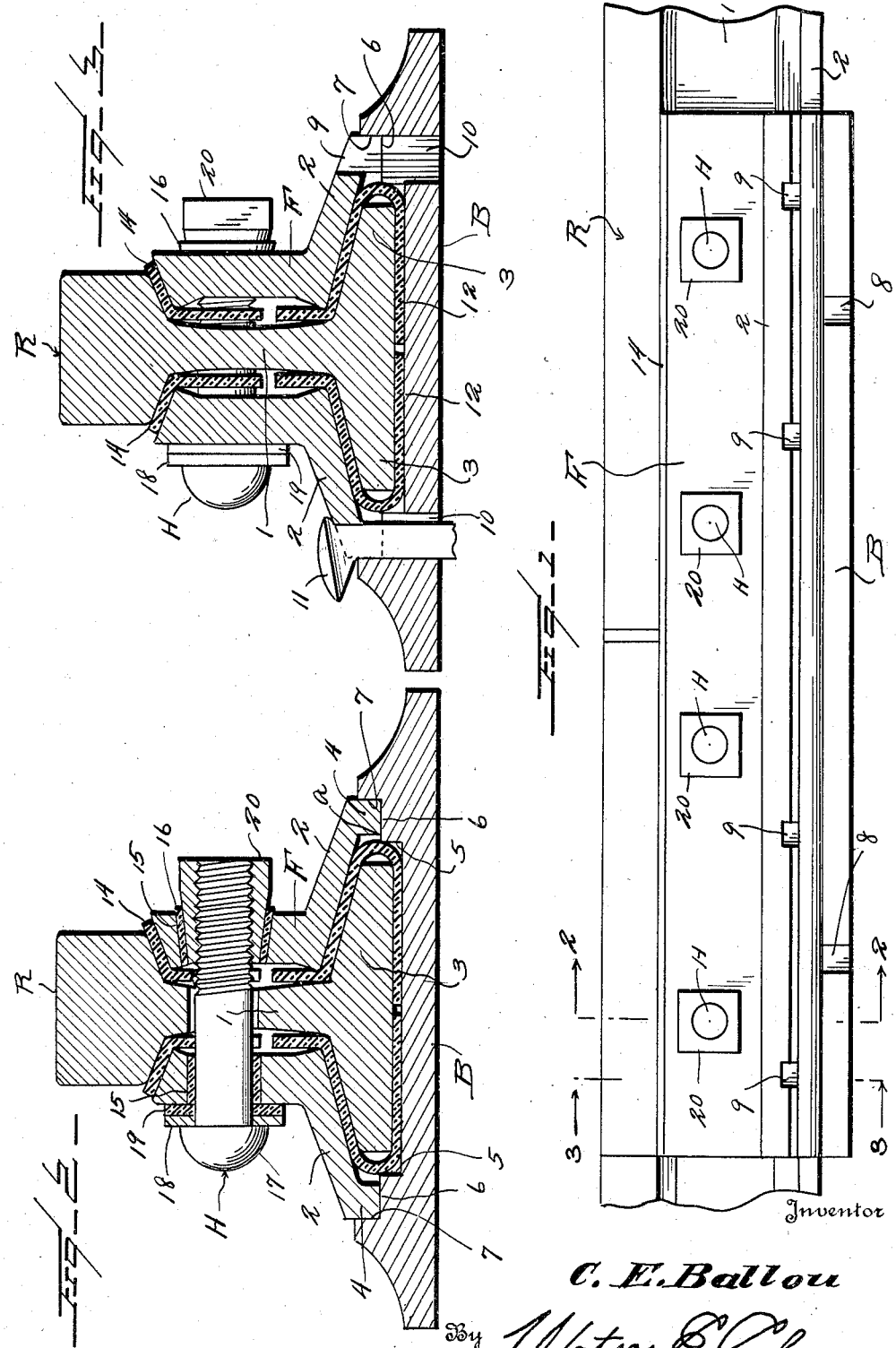
Inventor
C. E. Ballou
By Watson E. Coleman
Attorney

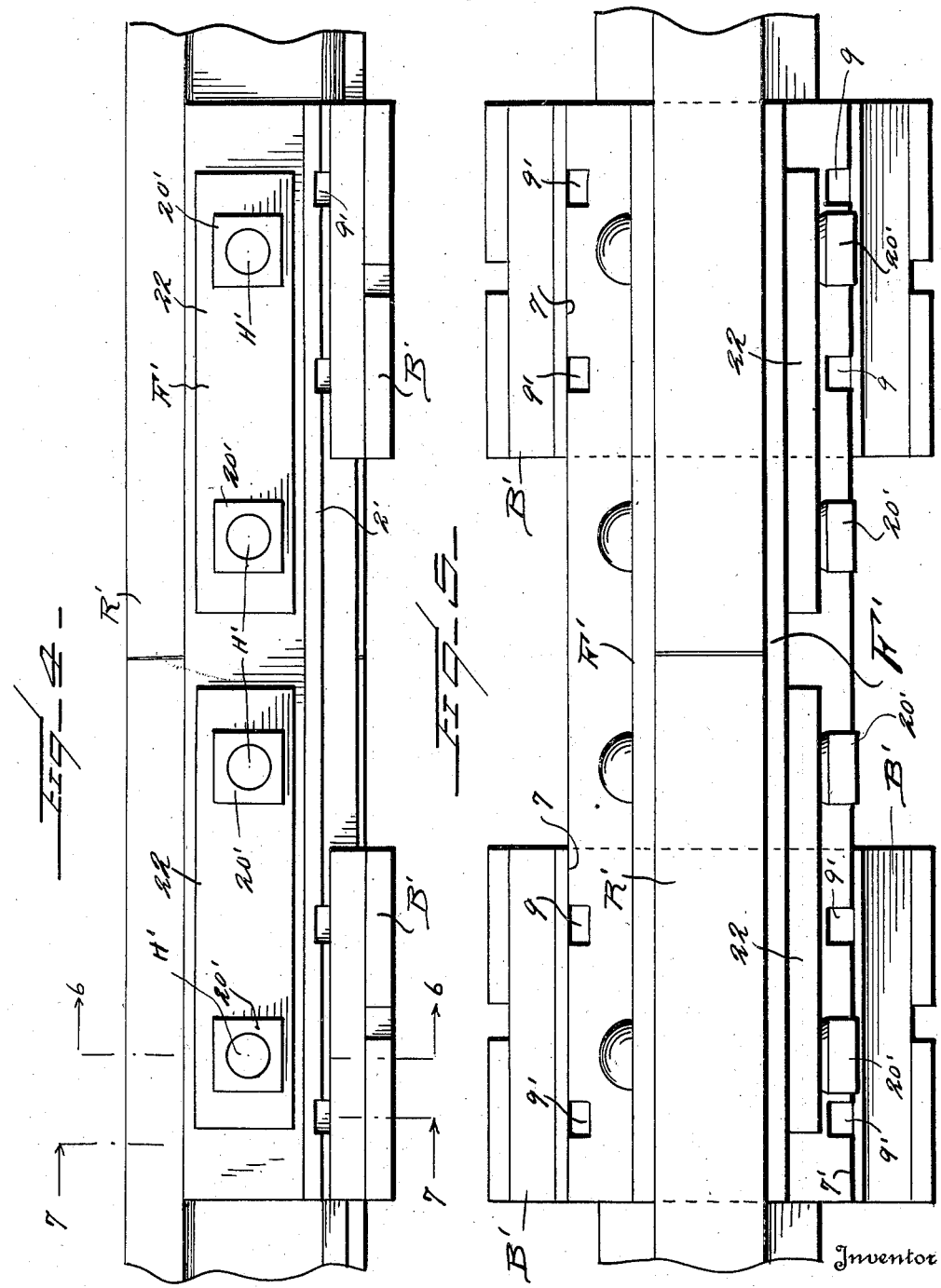

Aug. 5, 1930.                C. E. BALLOU                1,772,382
                              RAIL JOINT
                  Filed July 16, 1929        3 Sheets-Sheet 3
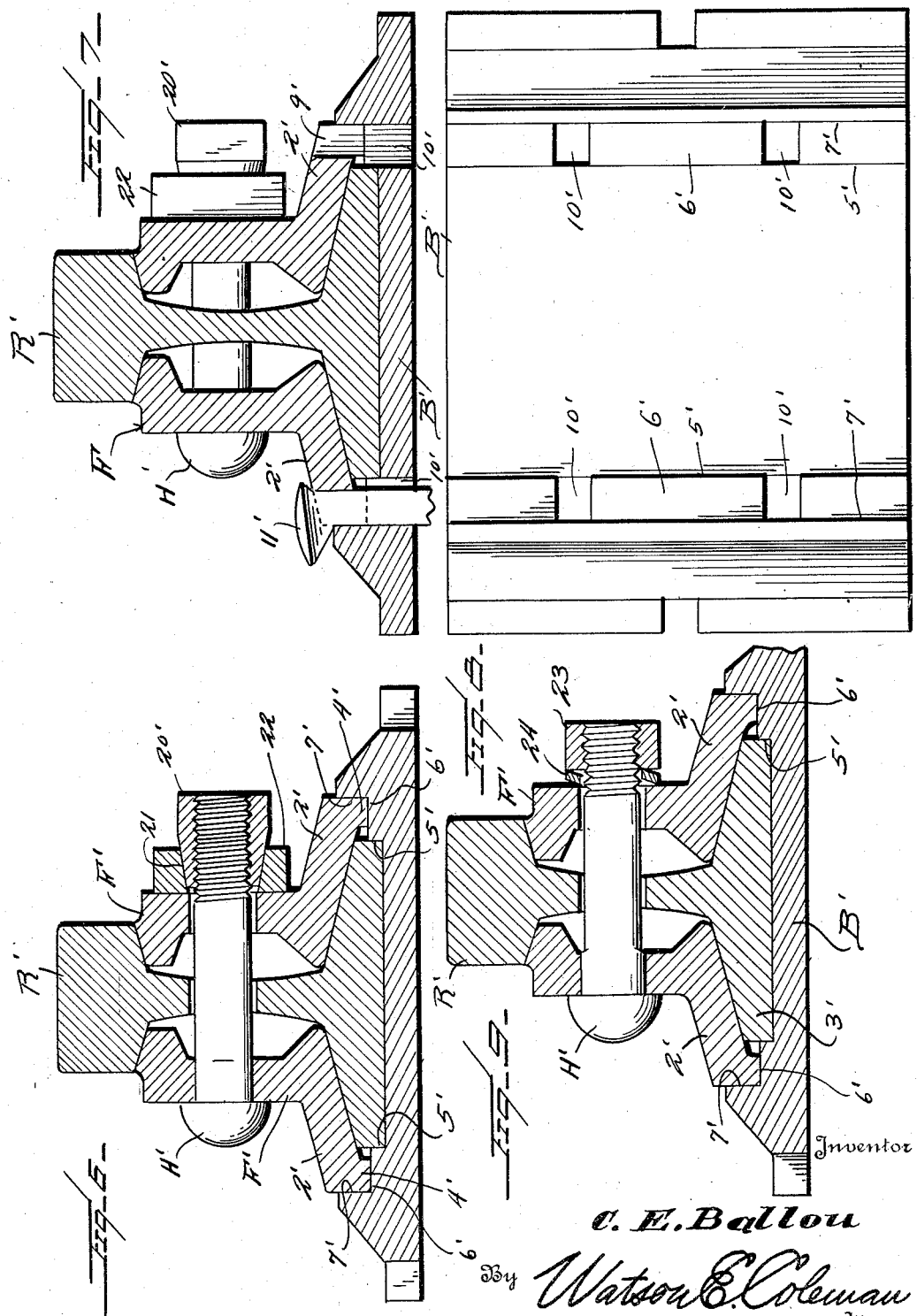
Inventor
C. E. Ballou
By Watson E. Coleman
Attorney Patented Aug. 5, 1930

1,772,382

UNITED STATES PATENT OFFICE

CHARLES E. BALLOU, OF ROANOKE, VIRGINIA

RAIL JOINT

Application filed July 16, 1929. Serial No. 378,780.

This invention relates to rail joints of a type wherein the meeting ends of the rails are connected by fish plates secured to the opposite sides of the rails through the instrumentality of bolts, and it is an object of the invention to provide means whereby the strain on such bolts is materially reduced, thus facilitating the maintenance of an effective joint with the tendency of the bolts to stretch substantially eliminated.

It is also an object of the invention to provide a joint of this kind wherein the fish plates are of an angle type and wherein is employed a base plate upon which a rail is rested and which plate is provided with means for maintaining said base plate and rail in a fixed relative assembly, together with shoulders carried by the base plate with which the base flanges of the fish plates abut, said base plate serving to provide effective means for materially reducing strain upon the holding bolts for the fish plates and more especially to substantially eliminate stretching of said bolts.

An additional object of the invention is to provide a rail joint structure including fish plates coacting with the opposite sides of the meeting ends of rails, together with a base plate or plates directly associated with the rails and fish plates and wherein means are provided to readily effect an adjustment of the fish plates to compensate for any loosening which may occur in the joint.

A still further object of the invention is to provide a rail joint structure comprising fish plates adapted to be held to the opposite sides of the meeting ends of rails by bolts of any desired type together with a base plate or plates upon which the rails are rested, said base plate or plates having shoulders with which directly abut flanges carried by the fish plates, said flanges of the fish plates and the base plate having slots of different sizes whereby it is possible to insert through registering slots spikes of varying widths to provide effective means for maintaining the fish plates in tight engagement with the rails.

An additional object of the invention is to provide a rail joint structure including fish plates and a base plate or plates coacting with each other in a manner to assure an effective connection between the meeting ends of rails, together with means whereby the resultant joint is of an insulated character.

The invention consists in the details of construction and in the combination and arrangement of the several parts of my improved rail joint whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating an insulated rail joint constructed in accordance with an embodiment of my invention;

Figure 2 is a sectional view taken substantially on the line 2—2 of Figure 1;

Figure 3 is a sectional view taken substantially on the line 3—3 of Figure 1;

Figure 4 is a side elevational view illustrating a rail joint constructed in accordance with a further embodiment of my invention;

Figure 5 is a view in top plan of the joint as illustrated in Figure 4;

Figure 6 is a sectional view taken substantially on the line 6—6 of Figure 4;

Figure 7 is a sectional view taken substantially on the line 7—7 of Figure 4;

Figure 8 is a view in top plan of one of the base plates as comprised in Figure 4 unapplied;

Figure 9 is sectional view illustrating the use of the regulation bolt now generally employed.

In the embodiment of my invention as illustrated in Figures 1 to 3 inclusive, R denotes the meeting end portions of standard railroad rails and engaged with the opposite sides of the webs 1 of said rails are the fish plates F. Each of the fish plates is of an angle type wherein the outstanding flange 2 defining the lower marginal portion of each of said plates extends beyond the outer edge of the adjacent rail flange 3 and has its outer marginal portion provided therealong with a depending rib 4 which overlies the outer edge of the base flange 3 and extends downwardly of said outer edge to a point substantially midway thereof.

Or, in other words, the under face of the depending rib 4 of the fish plate as applied is positioned a material distance above the under face or surface of the rail.

In this embodiment of my invention the resultant joint is of an insulated type and the meeting end portions of the rails R are rested or placed from above upon a base plate B, said plate being of a length substantially equal to the length of the applied fish plates F. The plate B at substantially its transverse center is provided entirely therealong with a channel 5 of a width to receive the base flanges of the meeting end portions of the rails R whereby said rails R and base plate B in the assembly of the joint are maintained in a substantially fixed relative position.

The side walls of the channel 5 are provided therealong with the rabbets 6 resulting in the vertically disposed shoulders 7. The base walls of the rabbets 6 terminate below the upper surfaces of the outer portions of the base flanges 3 of the rails R. When the fish plates F are in applied or working position the under surfaces of the ribs 4 have direct contact with the faces a of the rabbets 6 with the outer edges of the base flanges 2 of the fish plates F in direct contact with the vertical shoulders 7.

By having the flanges 2 of the fish plates F abutting the shoulders 7 effective means is provided to relieve the holding bolts H for the fish plates F against undue strain and particularly against bolt stretching whereby the life of the joint is materially prolonged. As is believed to be obvious, the holding bolts H are for securing the fish plates F to the webs 1 of the rails R.

The outer marginal portions of the base plate B at desired points thereon are provided with the openings 8 through which are adapted to be directed conventional spikes for holding the plate B to the ties. The outer marginal portions of the flanges 2 of the fish plates F are provided with the notches or open slots 9 which, in the assembly of the joint, register with the inner end portions of the slots or oblong openings 10 provided in the base plate. It is to be particularly noted that the slots 9 substantially align with the openings 10 of the base plate.

In the initial assembly of the joint relatively narrow spikes may be employed for coaction with the base flanges 2 of the fish plates F, one of said spikes 11 being disposed through a registering slot 9 and opening 10, although if there should be any slight inaccuracy in the fitting of the parts it is believed to be obvious that spikes of greater width may be employed to compensate for such inaccuracy. The inaccuracy most liable to occur in applying the parts of the joint will result from the fish plates F being drawn too close to the webs 1 of the rails by the holding bolts H. It is also to be understood that larger or wider spikes are to be used when, after course of time, the fish plates F should become loosened from any cause. This maintaining of the fish plates F in proper contact with the base plate B is of utmost importance in order to assure a substantial elimination of the strain or bolt stretching upon the holding bolts H. The strain or bolt stretching is eliminated by reason of the fact that the spike 11 will force the fish plate F inwardly and upwardly and at the same time hold the rib 4 within the upstanding shoulders 7 of the plate B.

Interposed between the under surface of the base of each of the rails R and the base plate B are the sheets 12 of insulating material, said sheets also extending between the opposed surfaces of the flanges 2 and 3. Sheets 14 of insulating material are also interposed between the under surfaces of the ball of each of the rails R and the upper edge faces of the fish plates F. The openings 15 in the fish plates F through which the holding bolts H are directed are also provided with a lining 16 of insulating material.

The head 17 of each of the holding bolts has direct contact with an elongated plate 18 extending lengthwise of a plate F and interposed between said fish plate F and elongated plate 18 is a strip 19 of insulating material.

As illustrated in Figure 2 of the drawings, the holding bolt H has coacting therewith a conical nut 20 which, when applied, extends within the adjacent opening 15 and with which the insulating lining 16 directly coacts.

In the embodiment of my invention as particularly illustrated in Figures 4 to 8 inclusive, a base plate B' is arranged at each end portion of the fish plate F'. Each of these base plates B' is constructed in substantially the same manner as the base plate B referred to in the first embodiment of my invention except as to length. The base flanges 3' of the rails R' are snugly received within the channel 5' formed in the upper surfaces of the base plates B' while the bottom flanges 2' of the fish plates F' coact with the rabbet 6' in the same manner as hereinbefore set forth with respect to the first embodiment of my invention.

Each of the base plates B' is provided with a vertical shoulder 7' for direct contact with the depending beads 4' of the flanges 2' of the fish plates F' and the fish plates F' are held in position by the holding bolts H'. In this embodiment of my invention each of the holding bolts H' has coacting therewith a conical nut 20' which is received within a properly formed opening 21 disposed through the bar 22 extending along and in contact with the outer face of a fish plate F'.

As illustrated in Figures 7 and 8, the base plate is provided with the oblong openings 10' which, as in connection with the base plate B, are directed through the bottom walls of the rabbets 6' and are adapted to register with the open recesses or slots 9' provided in the outer marginal portions of the flanges 2' of the fish plates F'. Coacting with each set of registering openings 10' and slot 9' is a spike 11'.

The invention as illustrated in Figure 9 is substantially the same as that embodied in Figures 6 to 8 inclusive except that the holding bolt H" has engaged therewith a conventional nut 23, a split washer 24 or the like being disposed around the bolt H" and interposed between the nut 23 and the adjacent fish plate F'.

From the foregoing description it is thought to be obvious that a rail joint constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A base plate for a rail joint having a channel disposed along its upper surface and in which a portion of a rail is adapted to be rested, the side walls of said channel having rabbets disposed along the upper portions thereof to provide vertically disposed shoulders spaced outwardly from the channel proper, fish plates having bottom flanges for direct contact with said vertical shoulders, the bottom walls of the rabbets being positioned below the upper surfaces of the flanges of the rail rested upon the base plate within the channel, the outer marginal portions of the fish plates having depending ribs for contact with the base walls of the rabbets and means for holding said depending ribs on said rabbets, said holding means being adapted to urge the fish plates upwardly.

2. A base plate for a rail joint having a channel disposed along its upper surface and in which a portion of a rail is adapted to be rested, the side walls of said channel having rabbets disposed along the upper portions thereof to provide vertically disposed shoulders spaced outwardly from the channel proper, fish plates having bottom flanges for direct contact with said vertical shoulders, the outer margins of the flanges of the fish plates having spike slots spaced outwardly from the outer edge of said channel, the base plate having elongated spike openings disposed therethrough at the base walls of the rabbets, said slots of the flanges of the fish plates coinciding with the slots in the base plate, said slots permitting the use of spikes of different widths, said spikes forcing the fish plate inwardly and upwardly on the upper face portion of said rail flange.

3. A base plate for a rail joint having a channel disposed along its upper surface and in which a portion of a rail is adapted to be rested, the side walls of said channel having rabbets disposed along the upper portions thereof to provide vertically disposed shoulders spaced outwardly from the channel proper, fish plates having bottom flanges for direct contact with said vertical shoulders, the side marginal portions of the base plate being provided with spike openings spaced outwardly from said channel.

4. A rail joint comprising fish plates having outstanding base flanges, bolts, each bolt extending through the fish plates and a rail positioned therebetween, a base plate upon which the rail is rested, said base plate having shoulders at opposite sides of the rail with which the flanges of the fish plates may contact, said fish plates and base plate having registering slots and openings through which spikes are adapted to be directed, the openings being elongated in a direction transversely of the applied rail to permit use of spikes of varying widths, said openings being positioned outwardly from the opposite sides of the rail, said spikes being adapted to force the fish plates inwardly and upwardly toward said rail.

5. A rail joint comprising fish plates having outstanding base flanges, bolts, each bolt extending through the fish plates and a rail positioned therebetween, a base plate upon which the rail is rested, said base plate having shoulders at opposite sides of the rail with which the flanges of the fish plates directly contact, said fish plates and base plate having registering slots and openings through which spikes are adapted to be directed, the openings being elongated in a direction transversely of the applied rail and spaced outwardly therefrom to permit use of spikes of varying widths, insulation between the rail, base plate and fish plates, and insulation between the bolts and the fish plates and rail, said spikes being adapted to force the fish plates inwardly whereby to eliminate stretching of the bolts.

6. A rail joint comprising a pair of fish plates having outstanding downwardly inclined base flanges and a substantially vertically disposed apertured body member, bolts adapted to extend through the fish plates and a rail interposed therebetween, a base plate having a longitudinally disposed channel for loosely receiving the base flange of said rail, said base plate having spike receiving apertures positioned spaced outwardly from the rail base, said fish plates having openings in the outstanding flanges thereof registering with said apertures in said base plate whereby to receive spike members, said spike members being adapted to force the fish plates inwardly and upwardly against the rail, insulating means interposed between the fish plates and the rail and base plate whereby to insulate the rail from the base plate, one of said fish plates having tapering apertures therethrough, said bolts having conical nut members engaging in said tapering apertures of said fish plate, and insulating means interposed between said bolt and said openings, said insulation being also interposed between said conical nut and said tapering opening.

7. A rail joint comprising a pair of fish plates having substantially vertically disposed plate members and outwardly extending downwardly inclined flanges, said plates being adapted to be positioned against the opposite side portions of a rail, a channeled base plate adapted to receive the base flange of said rail, said base plate having apertures therethrough positioned adjacent the outer edge portion of the rail base and extending outwardly therefrom, said inclined flanges of said fish plates having openings therethrough registering with the openings in said base plate whereby to permit the use of spike members, said spike members being adapted to force the outstanding flanges inwardly and upwardly, bolt means for holding said fish plates against the rail, a longitudinal apertured bar member adapted to engage against the outer face of one of said fish plates, said apertures in said bar being of tapering construction, said bolt means comprising a threaded bolt member, and a conical nut member engaging said tapering apertures in said bar whereby to securely hold said fish plates against movement.

8. A rail joint comprising a pair of fish plates having outstanding downwardly inclined base flanges and a substantially vertically disposed apertured body member, bolts adapted to extend through the fish plates and a rail interposed therebetween, an elongated apertured plate interposed between the heads of the bolts and the fish plates, a base plate having a longitudinally disposed channel for loosely receiving the base flange of said rail, said base plate having spike receiving apertures positioned spaced outwardly from the rail base, said fish plates having openings in the outstanding flanges thereof registering with said apertures in said base plate whereby to receive spike members, said spike members being adapted to force the fish plates inwardly and upwardly against the rail, insulating means interposed between the fish plates and the rail and base plate whereby to insulate the rail from the base plate, one of said fish plates having tapering apertures therethrough, said bolts having conical nut members engaging in said tapering apertures of said fish plate, and insulating means interposed between said bolt and said openings, and between said elongated plate and the fish plate, said insulation being also interposed between said conical nut and said tapering opening.

9. A rail joint comprising fish plates having outstanding base flanges, bolts extending through the fish plates and a rail positioned between the plates, an apertured base plate upon which the rail is rested, said apertures in said base plate being positioned spaced outwardly from the outer edges of the rail flange, said fish plates having openings through the base flanges thereof registering with the openings of said base plate whereby to receive therethrough spikes of varying widths, said spikes being adapted to force the fish plates inwardly and upwardly toward said rail.

10. A rail joint comprising fish plates having outstanding base flanges, bolts extending through the fish plates and a rail positioned between the plates, an apertured base plate upon which the rail is rested, the apertures in said base plate being disposed outwardly from the outer edges of the rail base, the outer edge portions of said fish plate flanges being adapted to extend beyond the outer margins of the rail base and overlie said apertures in said base plate whereby to permit the insertion of spikes of varying widths, said spikes when inserted being adapted to force the fish plate flanges inwardly and upwardly on the rail base.

11. A rail joint comprising fish plates having outstanding base flanges, bolts extending through the fish plates and a rail positioned between the plates, an apertured base plate upon which the rail is rested, upstanding shoulders mounted on the base plate and disposed outwardly of the outer margins of the rail base, the outer margins of said base flanges of said fish plates being adapted to engage against said shoulders, said apertures in said base plate being disposed outwardly from the outer edges of the rail base and positioned in said shoulders, the outer edge portions of the fish plate flanges being adapted to overlie said apertures in said base plate whereby to permit the insertion of spikes of varying widths.

In testimony whereof I hereunto affix my signature.

CHARLES E. BALLOU.